United States Patent
Doerr et al.

(10) Patent No.: US 7,086,234 B2
(45) Date of Patent: Aug. 8, 2006

(54) GAS TURBINE COMBUSTION CHAMBER WITH DEFINED FUEL INPUT FOR THE IMPROVEMENT OF THE HOMOGENEITY OF THE FUEL-AIR MIXTURE

(75) Inventors: Thomas Doerr, Berlin (DE); Waldemar Lazik, Berlin (DE)

(73) Assignee: Rolls-Royce Deutschland Ltd & Co KG, Blankenfelde-Mahlow (DE)

( * ) Notice: Subject to any disclaimer, the term of this patent is extended or adjusted under 35 U.S.C. 154(b) by 0 days.

(21) Appl. No.: 10/429,236

(22) Filed: May 5, 2003

(65) Prior Publication Data

US 2004/0040311 A1 Mar. 4, 2004

(30) Foreign Application Priority Data

Apr. 30, 2002 (DE) .................. 102 19 354

(51) Int. Cl.
F02C 7/22 (2006.01)
F02C 7/26 (2006.01)

(52) U.S. Cl. .................. 60/776; 60/740; 60/737
(58) Field of Classification Search ............ 60/776, 60/737, 739, 740, 742, 746, 747, 748
See application file for complete search history.

(56) References Cited

U.S. PATENT DOCUMENTS

| | | | | |
|---|---|---|---|---|
| 3,568,650 A | * | 3/1971 | Albrich .................. 123/559.1 |
| 3,699,773 A | | 10/1972 | Schuning |
| 3,703,259 A | * | 11/1972 | Sturgess et al. ............ 239/400 |
| 3,713,588 A | * | 1/1973 | Sharpe ....................... 239/400 |
| 3,808,803 A | * | 5/1974 | Salvi ........................... 60/737 |
| 3,866,413 A | * | 2/1975 | Sturgess ....................... 60/742 |
| 3,919,840 A | * | 11/1975 | Markowski ................... 60/737 |
| 3,977,186 A | * | 8/1976 | Arvin et al. ................... 60/742 |
| 3,980,233 A | * | 9/1976 | Simmons et al. .......... 239/400 |
| 4,099,505 A | * | 7/1978 | Stumpp et al. ............. 123/452 |
| 4,175,380 A | * | 11/1979 | Baycura ....................... 60/776 |
| 4,222,243 A | * | 9/1980 | Mobsby ........................ 60/742 |
| 4,237,694 A | * | 12/1980 | Wood et al. ................... 60/738 |
| 4,519,958 A | * | 5/1985 | Kendig ....................... 261/50.2 |
| 4,845,952 A | | 7/1989 | Beebe |
| 4,854,127 A | | 8/1989 | Vinson et al. |
| 5,154,059 A | * | 10/1992 | Keller ........................... 60/737 |
| 5,251,447 A | | 10/1993 | Joshi |
| 5,375,995 A | * | 12/1994 | Dobbeling et al. ............ 431/8 |
| 5,511,375 A | | 4/1996 | Joshi et al. |
| 5,515,680 A | * | 5/1996 | Fujimura et al. .............. 60/737 |
| 5,590,529 A | * | 1/1997 | Joshi et al. ................... 60/737 |
| 5,609,030 A | * | 3/1997 | Althaus ....................... 60/737 |
| 5,778,676 A | | 7/1998 | Joshi |
| 5,916,142 A | * | 6/1999 | Snyder et al. ................. 60/748 |

(Continued)

FOREIGN PATENT DOCUMENTS

DE 19533055 3/1996

(Continued)

OTHER PUBLICATIONS

German Search Report Oct. 29, 2002.

Primary Examiner—William Rodriguez
(74) Attorney, Agent, or Firm—Timothy J. Klima

(57) ABSTRACT

A gas turbine combustion chamber with a burner 7, includes means for the supply of fuel and an atomizer 6, wherein the means for the supply of fuel are provided such that the fuel is injected in areas with maximum airflow velocity.

19 Claims, 9 Drawing Sheets

U.S. PATENT DOCUMENTS

| | | | |
|---|---|---|---|
| 5,927,076 A | 7/1999 | Pillsbury | |
| 5,983,642 A * | 11/1999 | Parker et al. | 60/737 |
| 6,045,351 A | 4/2000 | Dobbeling et al. | |
| 6,094,916 A | 8/2000 | Puri | |
| 6,122,916 A * | 9/2000 | Amos et al. | 60/747 |
| 6,158,223 A * | 12/2000 | Mandai et al. | 60/737 |
| 6,216,466 B1 * | 4/2001 | Alkabie | 60/746 |
| 6,238,206 B1 * | 5/2001 | Cummings et al. | 431/181 |
| 6,334,309 B1 * | 1/2002 | Dean et al. | 60/737 |
| 6,363,725 B1 * | 4/2002 | Mei et al. | 60/737 |
| 6,418,726 B1 * | 7/2002 | Foust et al. | 60/776 |
| 6,453,660 B1 * | 9/2002 | Johnson et al. | 60/39.821 |
| 6,460,345 B1 * | 10/2002 | Beebe et al. | 60/777 |
| 6,481,209 B1 * | 11/2002 | Johnson et al. | 60/746 |
| 6,536,412 B1 * | 3/2003 | Someno et al. | 123/436 |
| 6,634,175 B1 * | 10/2003 | Kawata et al. | 60/746 |
| 6,675,581 B1 * | 1/2004 | Stuttaford et al. | 60/737 |
| 6,691,516 B1 * | 2/2004 | Stuttaford et al. | 60/737 |
| 6,705,087 B1 * | 3/2004 | Ohri et al. | 60/748 |
| 6,722,132 B1 * | 4/2004 | Stuttaford et al. | 60/737 |
| 2002/0014078 A1 * | 2/2002 | Mandai et al. | 60/737 |
| 2002/0139121 A1 * | 10/2002 | Cornwell et al. | 60/776 |
| 2002/0162333 A1 * | 11/2002 | Zelina | 60/776 |
| 2004/0055270 A1 * | 3/2004 | Blomeyer | 60/39.12 |
| 2004/0055308 A1 * | 3/2004 | Blomeyer | 60/737 |

FOREIGN PATENT DOCUMENTS

| | | |
|---|---|---|
| DE | 19527453 | 1/1997 |
| DE | 19535370 | 3/1997 |
| DE | 19757189 | 6/1999 |
| EP | 0724115 | 7/1996 |
| EP | 0751345 | 1/1997 |
| EP | 0870989 | 10/1998 |
| EP | 1172610 | 1/2002 |
| EP | WO 02/095293 | * 11/2002 |
| GB | 2012415 | 7/1979 |

* cited by examiner

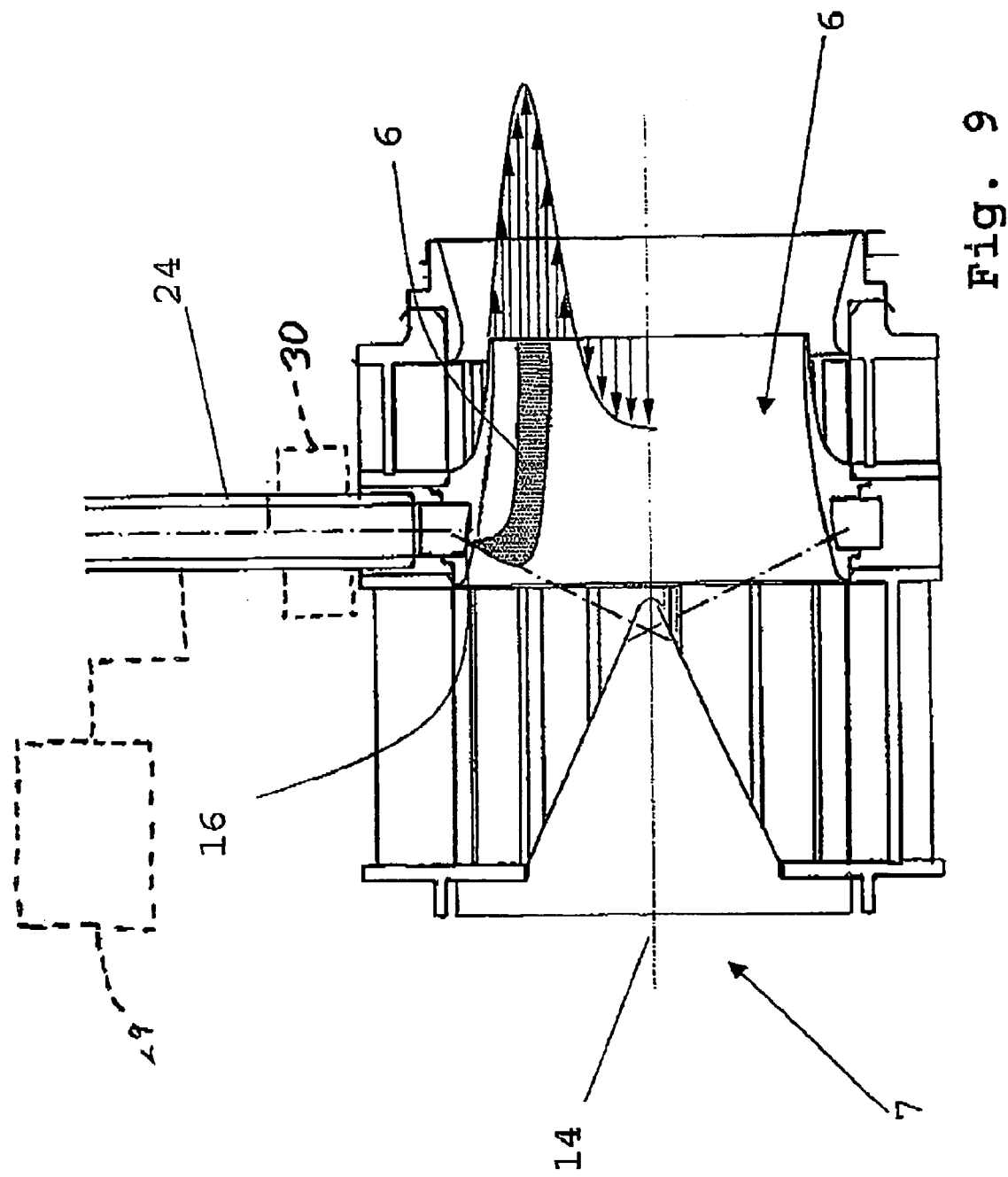

GAS TURBINE COMBUSTION CHAMBER WITH DEFINED FUEL INPUT FOR THE IMPROVEMENT OF THE HOMOGENEITY OF THE FUEL-AIR MIXTURE

This application is a Continuation-In-Part of U.S. patent application Ser. No. 10/425,888 (now abandoned) by DORR et al., entitled Gas Turbine Combustion Chamber with Defined Fuel Input for the Improvement of the Homogeneity of the Fuel-Air Mixture, filed Apr. 30, 2003, the entirety of which is incorporated by reference herein.

This application claims priority to German Patent Application DE10219354.1 filed Apr. 30, 2002, the entirety of which is incorporated by reference herein.

BACKGROUND OF THE INVENTION

This invention relates to a gas turbine combustion chamber with a burner, with means for the supply of fuel and with an atomizer.

Various forms of gas turbine combustion chambers are known from the state of the art.

For reduction of the pollutant load, in particular nitrogen oxide emissions, the fuel must generally be premixed with as much air as possible to obtain lean combustion, i.e. one characterized by air excess.

In the case of aircraft gas turbines, it is further necessary to obtain high overall efficiency and reduced nitrogen oxide emission. This calls for high energy turnover and correspondingly large fuel mass flows within the combustion chamber.

In the known combustion chambers, combustion is stabilized almost exclusively by means of swirling air promoting the re-circulation of the partly burned gases.

In the known designs, the fuel is introduced mostly centrally by means of a nozzle which is arranged on the center axis of an atomizer. Here, the fuel is often injected into the airflow with considerable overpressure so as to ensure adequate penetration and allow as much air as possible to be premixed with the fuel.

Such pressure atomizers are firstly designed to break up the fuel directly. In some designs of fuel injectors, the fuel is sprayed as completely as possible onto an atomizer lip. The fuel is accelerated by the airflow on the atomizer lip and atomized, or broken up, into fine droplets at the downstream end of the atomizer lip and mixed with the airflow.

In another form known from the state of the art, the fuel is applied to the atomizer lip by way of a so-called "film applicator", with the fuel being distributed as uniformly as possible as a film.

Specification EP 0 935 095 A2 shows a gas turbine combustion chamber with an annular fuel supply line from which fuel is introduced into an airflow either at the outer circumference of the airflow or in a further inward zone.

In the state of the art, it is disadvantageous that the injection of fuel by means of a central nozzle or a pressure atomizer, respectively, as well as the discharge of fuel in the form of a film on a film applicator will not—or only to a limited extend—provide for homogenous mixing of the fuel with the passing combustion airflow. Advanced combustion chambers—which are optimized for reduced nitrogen oxide emissions—are characterized in that large amounts of air are to be mixed with fuel within narrow stoichiometric limits before being supplied to combustion. Consequently, a large amount of the air entering the combustion chamber must flow through the fuel nozzle and be premixed here with fuel before combustion in the combustion chamber takes place. This air quantity can amount to 70 percent of the entire combustion chamber air. Since, for said reasons, this amount of air is very large, appropriately dimensioned flow areas must be provided in the fuel conditioning system or the fuel nozzle, respectively. It is further disadvantageous that the fuel jets and sprays exiting through such nozzles will not provide for adequate penetration of the—constantly growing—air passages of the combustion chambers, as a result of which the homogenous distribution of the fuel/air mixture will be fully or partly impaired.

BRIEF SUMMARY OF THE INVENTION

It is a broad aspect of the present invention to provide a gas turbine combustion chamber of the type described above which, while being simply designed, cost-effectively producible and dependable in operation, provides for a reliable, homogenous air-fuel mixture.

It is a particular object of the present invention to provide solution to the above problem by the features cited herein, with further objects and advantages of the present invention becoming apparent from the description below.

Accordingly, the present invention provides for means for the supply of fuel by which fuel is injected into areas with maximum airflow cross-sections.

The design according to the present invention is characterized by a variety of merits.

In accordance with the present invention, the fuel is initially discharged in a defined manner to those airflow zones in which the airflow velocities or the local air mass flows, respectively, are maximal. Thus, the present invention avoids that the fuel jets or sprays, respectively, must in a problematic manner penetrate the airflow within the atomizer over large distances, as is the case in the state of the art. The fuel is here discharged into that air passage of the atomizer which carries the maximum amount of the total air flowing through the atomizer.

Thus, the gas turbine combustion chamber according to the present invention effects a very uniform distribution of the fuel in the passing air, providing a homogenous fuel/air mixture.

The typical, swirling airflow within the combustion chamber effects that the areas of high local air mass flow are often located very closely to the radially outer rims of the air passages of the injector nozzle which face away from the center axis.

In a particularly favourable form of the present invention, the fuel is supplied from the radially outer rim of the air passage. This can be accomplished by tubes protruding into the airflow or by fuel jets exiting from openings in the outer rim.

Accordingly, fuel can be injected de-centrally in the vicinity of the locations with maximum airflow velocities. Other than with film applicators, a fuel film, which breaks down in the wake of the atomizer lip, will again not be applied. Rather, the fuel is introduced as far as possible upstream in the form of individual, discrete jets or sprays into those airflow areas which represent a high portion of local mass flow.

In accordance with the present invention, the form of the individual jets and their hole pattern (number, hole rows etc.) can preferentially be adapted to the required depth of intrusion of the fuel into the airflow, the required circumferential homogeneity and/or the load point for which the atomizer is to be optimized.

The present invention also allows for substitution of individual fuel jets by individual fuel sprays.

In the latter form, the individual exit openings (fuel nozzles) of the de-central fuel injection can be combined with a central fuel injection. Here, a central, pilot nozzle will be used. Fuel distribution between the pilot flame and the de-central injection can either be a fixed one or be selected in dependence of load.

In accordance with the present invention, fuel supply can be provided either separately or within a common supporting arm.

Accordingly, the present invention also allows for introduction of the fuel both into the inner and into the outer flow passage. For this purpose, various hole fields or hole sizes of the openings of the fuel passages can be provided (nozzle-type effect). These can be single-row or multi-row or be arranged in various hole patterns. Altogether, this allows the desired fuel quantities to be introduced into different areas and strata of the airflow.

It should also be noted that the present invention relates to multi-flute injection nozzles, these being preferably two-flute, but also three-flute or four-flute.

In an alternative form of the present invention, it is particularly favourable if the means for the supply of fuel comprise individual feed tubes protruding into the free cross-section of the atomizer. Such feed tubes—which may extend radially from a central fuel line—allow the fuel to exit into the described areas of the airflow in a very defined manner.

This is accomplished by defined "vaccination" of the air with fuel in the areas of maximum airflow velocity In the process, the fuel is introduced into the flow with the smallest impulse possible. Accordingly, other than with the film applicator known from the state of the art, a fuel film is not applied to the atomizer lip in the present invention. Rather, the fuel is placed far upstream at discrete locations in areas of the airflow which represent the maximum portion of local mass flow.

The feed tubes can, for example, extend spokewise centrally from the middle into the relevant areas of the airflow.

It can be particularly favourable if the feed tubes (spokes) are designed or profiled aerodynamically. This will only minimally impair the aerodynamics of the airflow.

In accordance with the present invention, the number of feed tubes can be adapted to the respective requirements, in dependence of the homogeneity of the fuel to be achieved in the circumferential direction of the airflow.

In a preferred development of the present invention, the feed tubes can be provided with a device for active cooling, for example a further fuel circuit. A favourable development of the present invention may also provide for the purging of the fuel by flushing the spokes with air so as to prevent thermal decomposition of the fuel in the event of a fuel shut-off.

The feed tubes can be arranged purely radially or purely axially relative to the nozzle axis, with mixed arrangements being possible as well.

The present invention is not limited to the introduction, or positioning, of feed tubes or the similar in the airflow cross-section. Rather, the process according to the present invention can also be realized by means of fuel nozzles which are arranged at the periphery of the airflow cross-section and allow the fuel to be injected into the airflow in the form of fuel jets or sprays. In this design variant, the fuel is therefore introduced by way of a suitable arrangement and dimensioning of nozzles and by application of adequate fuel pressure. Accordingly, suitable supply openings (nozzles) issue at the radially outer rim of the airflow passage and introduce the fuel into the airflow in the form of jets or sprays. Obviously, the individual exit openings or fuel nozzles can be arranged in a single row, in multiple rows or in various hole patterns. They also can have different diameters to create fuel jets or sprays of different intensity and depth of intrusion into the airflow.

In the form according to the present invention (and also in the following embodiments) the design of the nozzle of the combustion chamber is not limited to two air streams (two-flute) which are separated by a lip. Rather, the present invention also provides for any other embodiment.

BRIEF DESCRIPTION OF THE DRAWINGS

The present invention is more fully described in the light of the accompanying drawings showing preferred embodiments. In the drawings, –FIG. 9 is a schematic sectional side view of a fuel nozzle similar to FIG. 3 with representation of the velocity distribution of the airflow at the nozzle exit and the fuel flow.

DETAILED DESCRIPTION OF THE INVENTION

This detailed description should be read in conjunction with the Summary above, which is incorporated by reference in this section.

Figure 1:
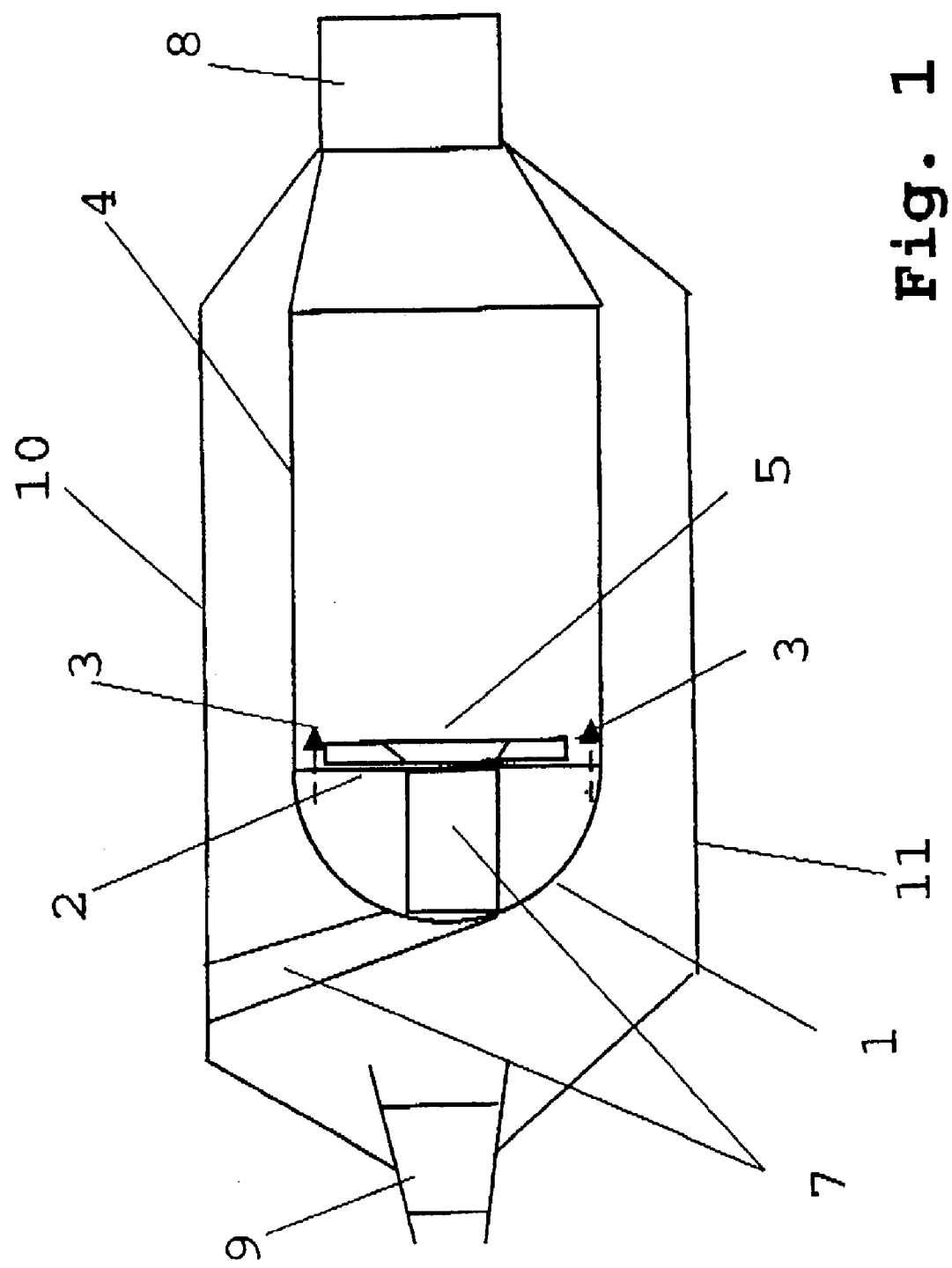
FIG. 1 is a schematic sectional view of a gas turbine combustion chamber according to the present invention.

FIG. 1 shows, in schematic side view, a section through a gas turbine combustion chamber in accordance with the present invention. It comprises a hood 1 of a combustion chamber head and a base plate 2. Further, a combustion chamber wall 4 is shown which connects to a turbine nozzle guide vane 8 shown in schematic representation. FIG. 1 also shows a combustion chamber outer casing 10 and a combustion chamber inner casing 11. In the inflow area, a stator vane 9 of the compressor outlet is shown. Reference numeral 7 shows a burner with burner arm and swirler. Further, the gas turbine combustion chamber comprises a heat shield 5 with a bore for the burner 7 and individual openings for the generation of a starter film 3, these openings not being shown in detail.

Further details of the gas turbine combustion chamber are dispensed with herein since these are known from the state of the art to which reference is made in this respect.

Figure 2:
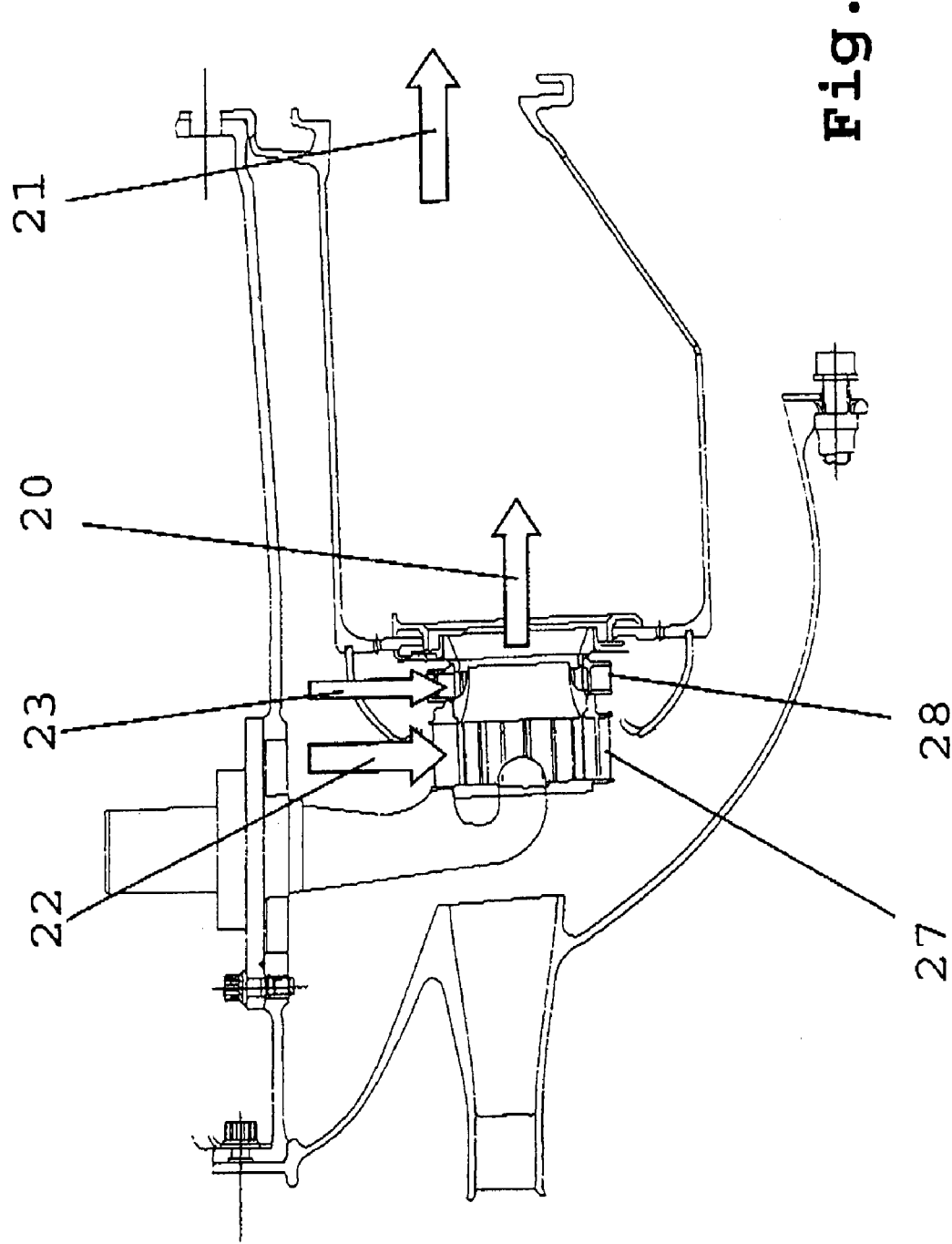
FIG. 2 is a schematic representation of the air distribution in a low-pollutant gas turbine combustion chamber.

FIG. 2 is a schematic representation of the distribution of the air flowing through the gas turbine combustion chamber. Here, a major amount of the air mass flow enters the combustion chamber via the fuel nozzle as nozzle air mass flow 20. This nozzle air mass flow 20 is mixed with fuel before the mixture is burnt in the combustion chamber, and finally leaves the combustion chamber as exit mass flow 21. The ratio between the nozzle air mass flow 20 and the exit mass flow 21 must amount to 75% to achieve reduced nitrogen oxide emissions on low-pollutant combustion chambers. If the fuel nozzle is of the two-flute design, the nozzle air mass flow 20 is divided into a primary air passage 22 and a secondary air passage 23. The primary flow or primary air passage 22 is pre-mixed with fuel, which is then mixed with the secondary flow or secondary air passage 23 and enters the combustion chamber.

Here, the primary flow 22—with more than 40 percent air relative to the nozzle air mass flow 20—carries a major amount of the nozzle air mass flow 20 entering the combustion chamber via the nozzle.

Figure 3:
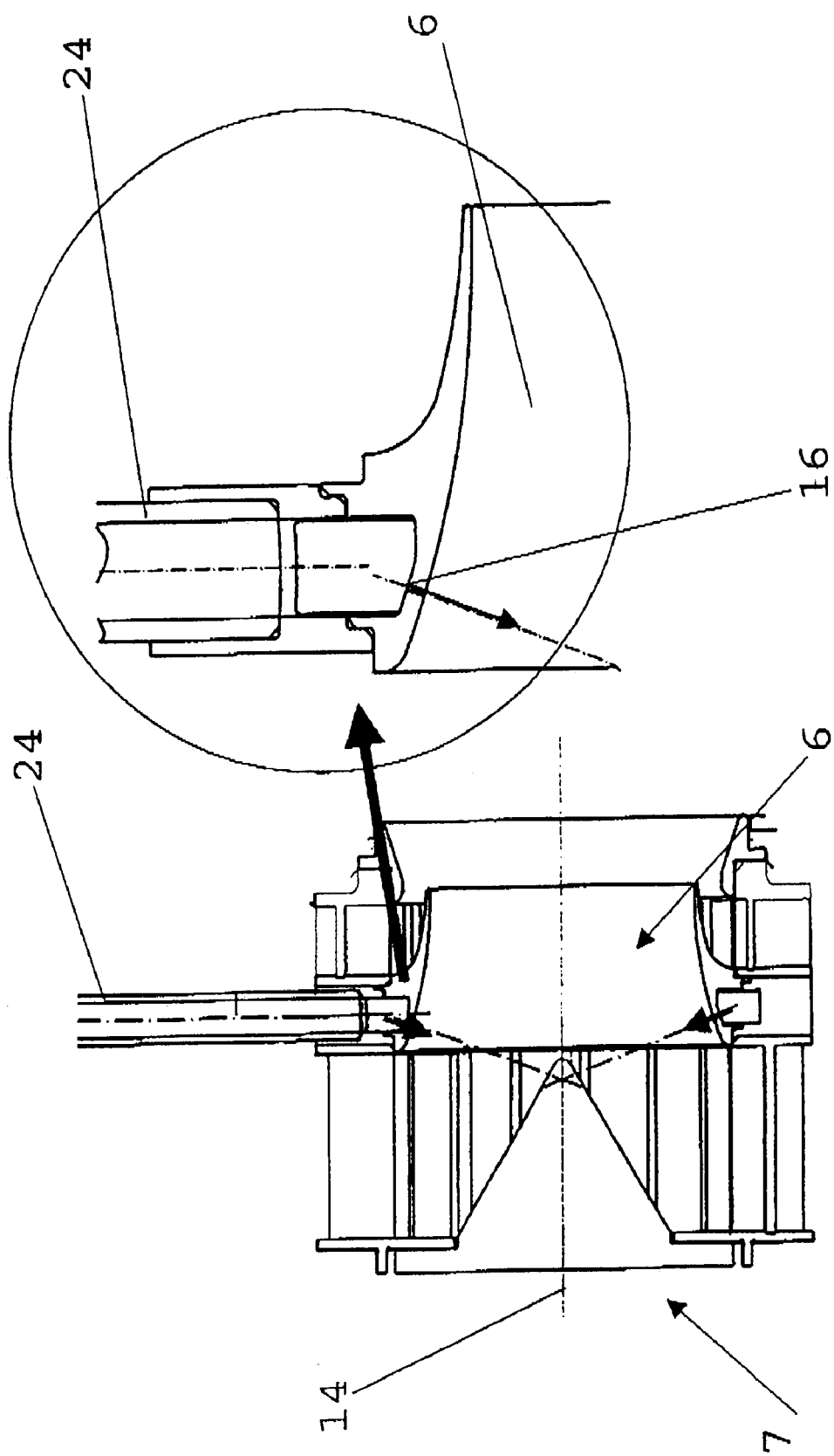
FIG. 3 is a sectional side view of a first embodiment with a fuel nozzle with de-central injection according to the present invention (with enlarged detail)

FIG. 3 shows a first embodiment in which the feed tubes 24 for the supply of fuel from the outside issue into the atomizer 6 or into an annulus not further designated. The small arrowheads each indicate the direction of exit of the fuel jets through the exit openings 16. Apparently, the design allows for angular orientation of the center lines of the exit openings 16 for the fuel.

Figure 4:
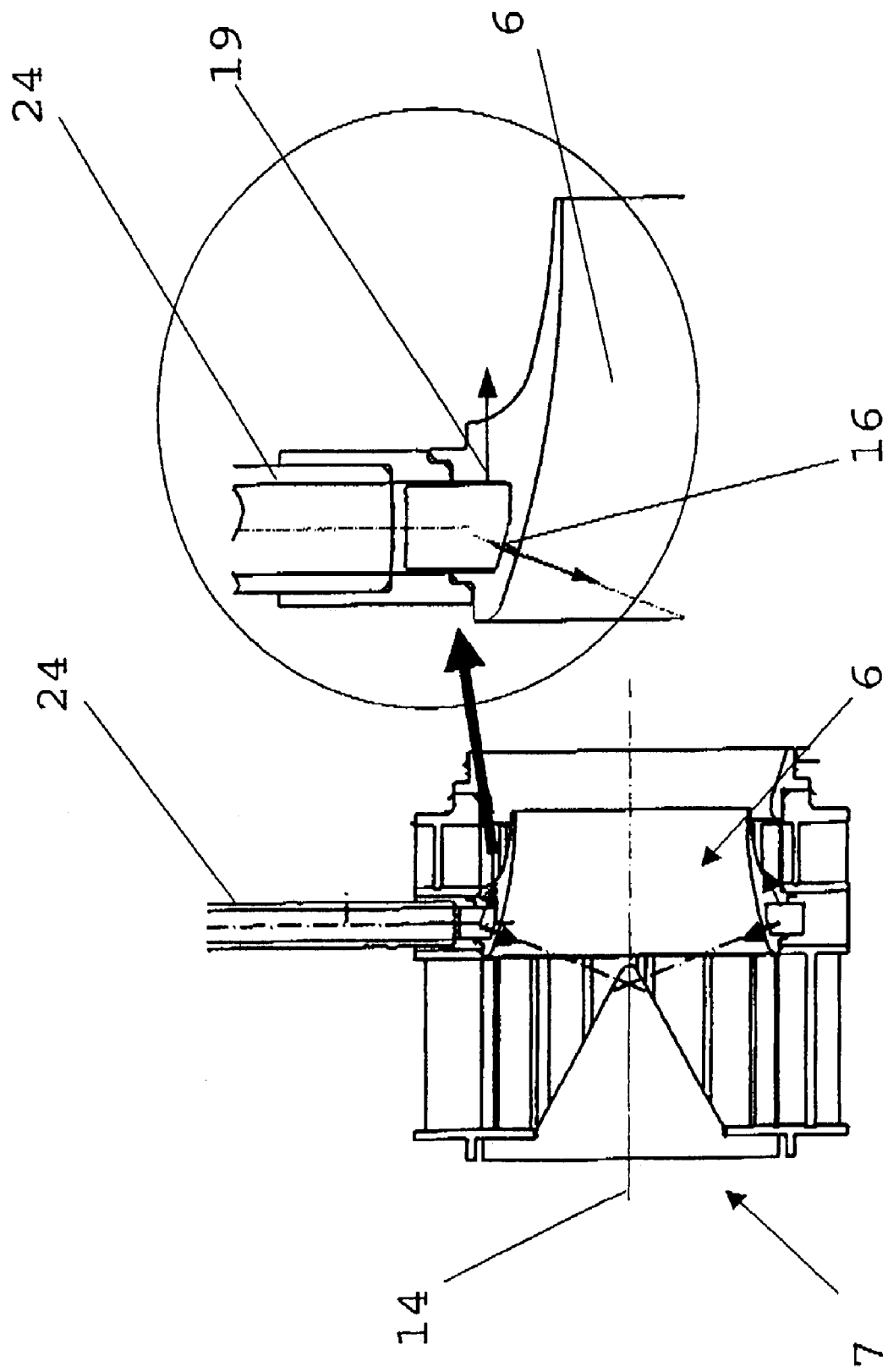
FIG. 4 is a sectional side view analogically to FIG. 3 of a further embodiment of a fuel nozzle with injection of the fuel into the inner flow passage (primary air passage) and into the outer flow passage (secondary air passage)

FIG. 4 shows an embodiment similar to FIG. 3 with an enlarged area again being shown in a circular cutout. As illustrated, the fuel feed tube 24 issues into an exit opening 16 from which the fuel is injected into the air mass flow such that the fuel is partially orientated against the direction of flow. Thus, fuel is introduced into the inner airflow passage.

A further exit opening 19 going off from the fuel feed tube 24 injects fuel into the outer airflow passage. Arrowheads indicate both directions of fuel injection.

Figure 5:
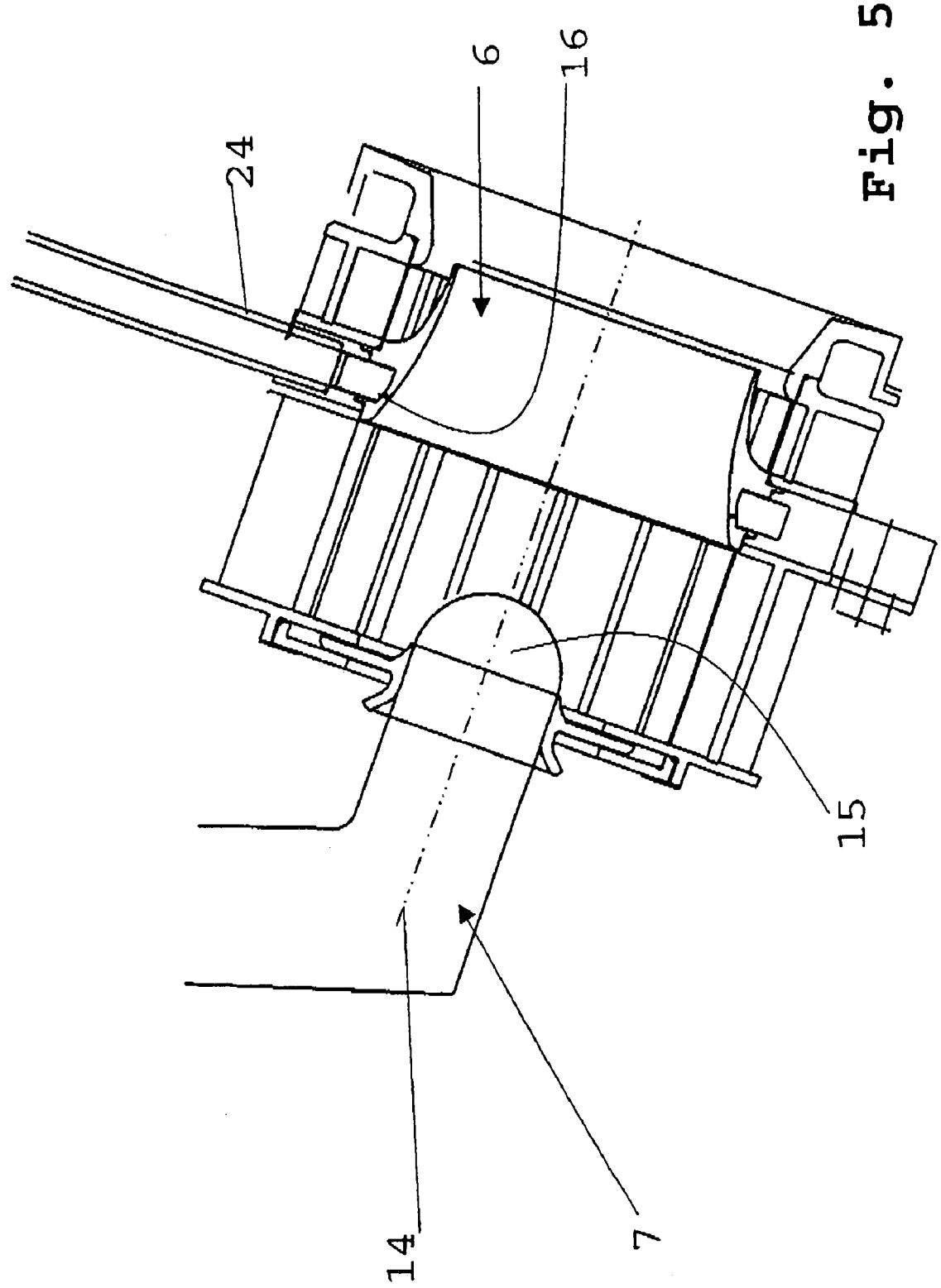
FIG. 5 is a sectional side view of a further embodiment of a fuel nozzle with combined central and de-central injection with separate fuel supply.

FIG. 5 shows a further embodiment of a fuel nozzle according to the present invention in which the de-central fuel injection through the exit openings 16 is combined with a central fuel injection 15. Fuel is here supplied separately to the exit holes 16 or to the central fuel injection 15, respectively.

Figure 6:
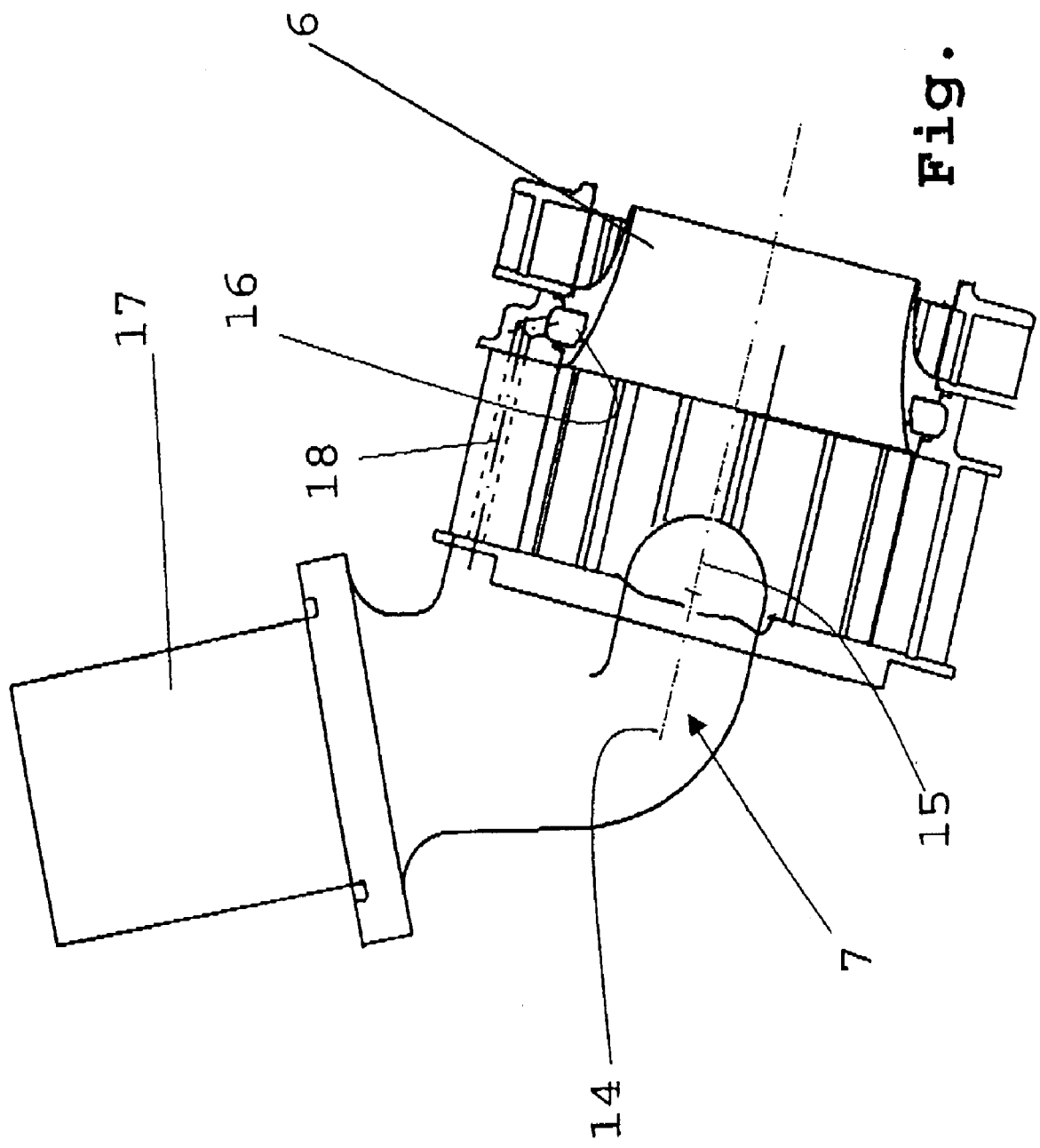
FIG. 6 is a sectional view similar to FIG. 3 or 4 of a further embodiment of a fuel nozzle with combined central and de-central fuel injection with common fuel supply.

A further embodiment is shown in FIG. 6. In this embodiment, a central fuel injection 15 in the area of the nozzle axis 14 is again combined with a de-central fuel injection via circumferential exit openings 16, but with the fuel being supplied to the central fuel injection 15 and to the de-central fuel injection via the exit openings 16 by way of a common burner arm 17, as shown schematically.

Figure 7:
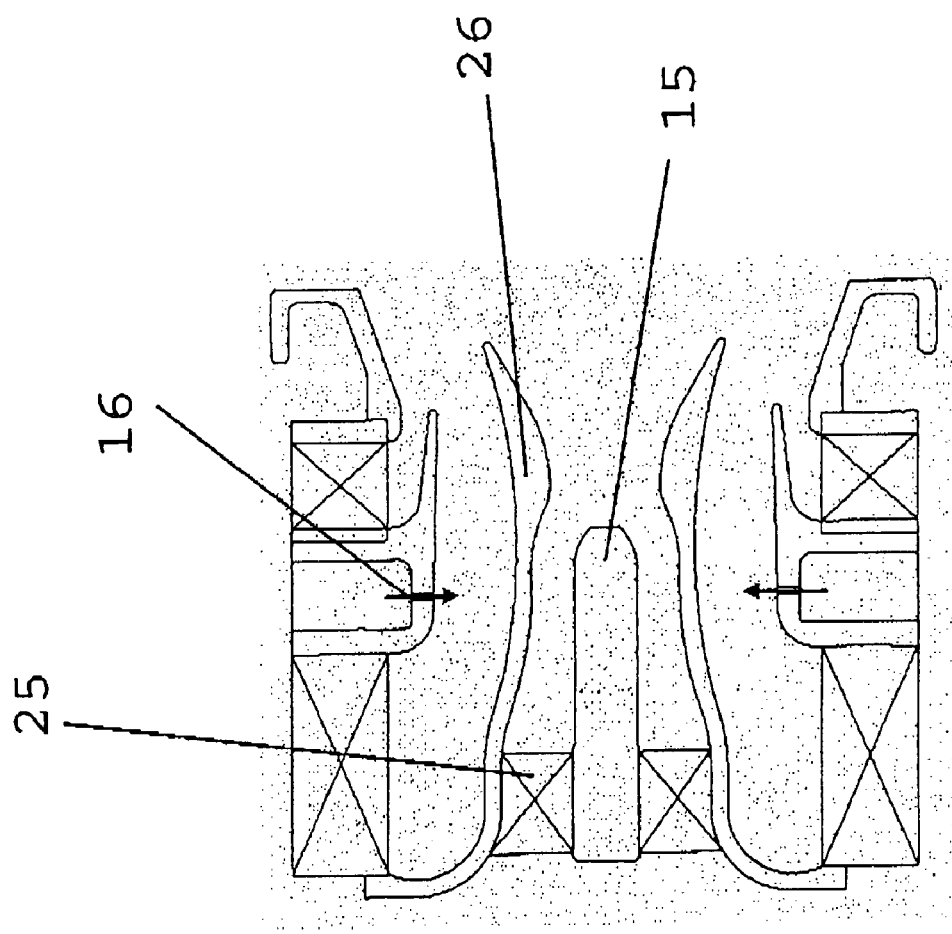
FIG. 7 is a sectional side view of a further embodiment of a fuel nozzle similar to FIG. 5 with combined central and de-central injection with separate fuel supply and separate air guidance.

FIG. 7 shows a further embodiment with a combination of a central fuel injection 15 in the area of the nozzle axis and a de-central fuel injection via exit openings 16 in the circumferential area, but with the central fuel injection 15 with an additional pilot swirler 25 and a pilot nozzle 26 being arranged remotely from the de-central fuel injection via exit openings 16.

Figure 8:
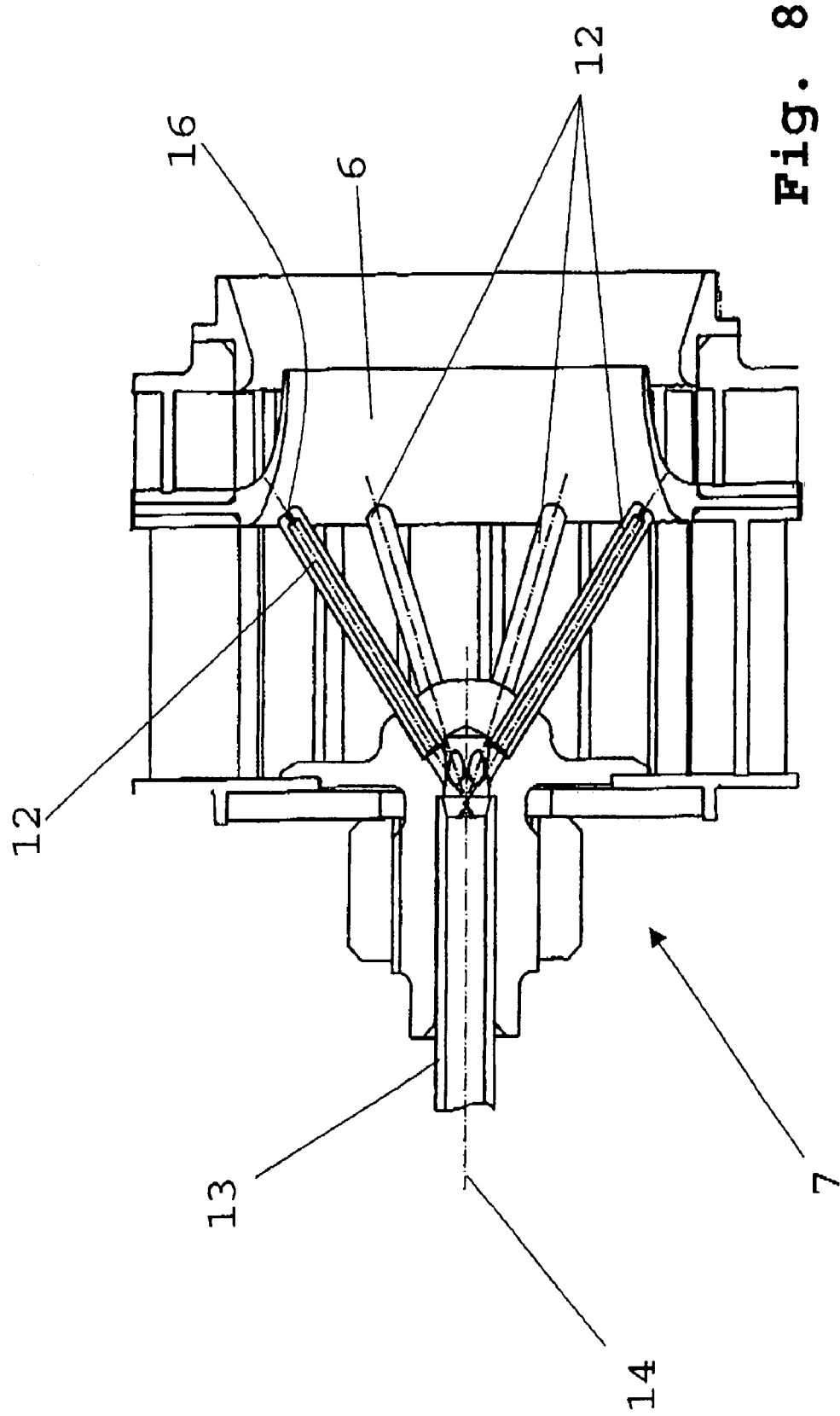
FIG. 8 is a sectional side view analogically to FIG. 3 of a further embodiment of a fuel nozzle.

FIG. 8 shows a modified embodiment of a fuel nozzle according to the present invention in sectional side view. Starting out from a central fuel line 13, feed tubes 12 extend spokewise outward. The arrangement is symmetrical to the nozzle axis 14. As illustrated in their sectional view, the feed tubes 12 each feature a fuel exit opening at their free ends through which the fuel can be discharged into the area of the outer wall of the atomizer 6.

In the embodiment shown in FIG. 8, provision is made for a total of six feed tubes 12.

For clarity, FIG. 9 shows the velocity distribution of the airflow at the nozzle rim and the flow of the fuel introduced via the exit opening 16. As is apparent, the fuel is introduced into the airflow area or cross-section in which the airflow velocity is maximal.

As explained before in this document, the present invention provides for discharge of fuel in areas with maximum airflow velocities and, alternatively, in areas with maximum local air mass flows. This process can be optimized in dependence of the respective operating conditions, the density conditions or similar. In dependence of the operating conditions, it is possible that the density of the air is equal so that the maximum air mass flows will have maximum airflow velocities. The possibility to arrange the exit holes of the fuel (exit openings) in a single row or in multiple rows, to change the hole fields or hole sizes and to provide various hole patterns enables adaptation to the most different operating conditions, as appropriate. Also, it is possible to activate some of the exit openings and to deactivate others temporarily, for example by means of separate fuel feed tubes.

The above description of the embodiments (FIGS. 2 to 7) relates to designs which have feed tubes with the respective exit openings. Also, as mentioned before, suitable nozzles may be provided (for example the exit openings 16 of the embodiment of FIG. 9) to introduce fuel jets or sprays into the free airflow. It is not necessary that the feed tubes protrude or open into the airflow cross-section. Rather, the fuel can be discharged via the nozzles, these nozzles also being referred to and shown as openings 16 in the embodiments.

The present invention was explained in the above specification in terms of apparatus features. As is apparent, the present invention applies similarly to a process for the introduction of fuel, with the process being designable for the introduction of fuel in the airflow areas featuring maximum velocities or in the airflow areas featuring maximum mass flow. This will not result in a limitation of the apparatus features according to the above specification.

Summarizing, then, an air-fuel mixer in accordance with the present invention is characterized in that it is flown by an amount of air of more than 40 percent of the entire combustion chamber air and that it is divided into a primary air passage and into a secondary air passage by way of a flow divider, with the primary air passage being flown by at least 30 percent of the entire mixer air. The secondary air passage is arranged radially outward and shrouds the primary air passage. The flow divider firstly imparts a certain acceleration to the primary airflow by way of its contour and by way of the ratio between the exit area of the swirler and the exit area of the flow divider and secondly introduces liquid fuel from inlet openings distributed over the flow divider inner circumference into the primary flow. Alternatively, the fuel is introduced from a central supply via one or several feed tubes into the primary air passage in the immediate vicinity of the flow divider.

In the mixer, the fuel can also be introduced into the secondary air passage.

Furthermore, the air in the primary air passage can be swirled by means of radial, axial or diagonal (combined radial and axial) swirlers.

The air in the secondary air passage can be swirled by means of radial, axial or diagonal (combined radial and axial) swirlers.

In the mixer described, the fuel is discharged homogeneously or inhomogeneously on the circumference of the fuel divider, with the inlet openings being designed either as single jet or single spray. The inlet openings are single-row or multi-row. The openings on the circumference can have equal or different size and any circumferential distribution.

In the mixer described, the fuel can also be introduced via similarly or differently designed feed tubes. Differences can be in the design of the feed tubes, such as shape, length, orientation, curvature, in the form of the exit openings, such as hole size or hole shape, and/or in the location of the exit opening relative to the flow divider.

The mixer can be operated in combination with a pilot burner which is implemented in the primary air passage and which is activated under part-load conditions.

The mixer can also be operated in combination with a pilot burner and a pilot swirler which is implemented in the primary air passage and is separated from the primary flow by a flow divider. The pilot airflow can be swirled by means of an axial, a radial or diagonal swirler.

Fuel injection is preferably accomplished with a device for active cooling, such as a further fuel circuit 30 (FIG. 9: see the description thereof in the above Summary section) and/or a device 29 (FIG. 9) for fuel purging by flushing with air.

It will be appreciated, however, that many details can be allowed to differ from the embodiments illustrated without departing from the inventive concept. It is also intended that various aspects of the embodiments disclosed herein can be combined in various manners to create different embodiments.

LIST OF REFERENCE NUMERALS

| | |
|---|---|
| 1 | Hood of the combustion chamber head |
| 2 | Base plate |
| 3 | Starter film |
| 4 | Combustion chamber wall |
| 5 | Heat shield with bore for burner 7 |
| 6 | Atomizer |
| 7 | Burner with burner arm and swirler |
| 8 | Turbine nozzle guide vane |
| 9 | Guide vane in compressor outlet |
| 10 | Combustion chamber outer casing |
| 11 | Combustion chamber inner casing |
| 12 | Feed tube (fuel line) |
| 13 | Central fuel line |
| 14 | Nozzle axis |
| 15 | Central fuel injection |
| 16 | Exit opening (nozzle) |
| 17 | Burner arm |
| 18 | Fuel line |
| 19 | Exit opening |
| 20 | Nozzle air mass flow |
| 21 | Exit mass flow |
| 22 | Primary air passage |
| 23 | Secondary air passage |
| 24 | Feed tube |
| 25 | Pilot swirler |
| 26 | Pilot nozzle |
| 27 | Primary passage swirler |
| 28 | Secondary passage swirler |

What is claimed is:

1. A gas turbine combustion chamber comprising a burner; and means for the supply of fuel, the burner comprising an atomizer and a primary airflow through the atomizer, the primary airflow having a varying velocity distribution through the atomizer with a maximum airflow velocity and a minimum airflow velocity, wherein the means for the supply of fuel are provided such that the fuel is injected into areas of the primary airflow with the maximum airflow velocity.

2. A gas turbine combustion chamber comprising a burner; and means for the supply of fuel, the burner comprising an atomizer and a primary air mass flow through the atomizer, the primary air mass flow having a varying mass flow distribution through the atomizer with a maximum local air mass flow and a minimum local air mass flow, wherein the means for the supply of fuel are provided such that the fuel is injected into areas of the primary air mass flow with the maximum local air mass flow.

3. A gas turbine combustion chamber in accordance with claim 1, wherein a primary air passage of the burner feeds the combustion chamber with a major amount of the air required for mixing and burning.

4. A gas turbine combustion chamber in accordance with claim 1, wherein the means for the supply of fuel comprises at least one of individual feed tubes and exit openings protruding into a free cross-section of the atomizer.

5. A gas turbine combustion chamber in accordance with claim 4, wherein the at least one of the feed tubes and the exit openings issue from an outside into the area of airflow.

6. A gas turbine combustion chamber in accordance with claim 5, wherein the at least one of the feed tubes and the exit openings are combined with a central fuel injection.

7. A gas turbine combustion chamber in accordance with claim 4, wherein the at least one of the feed tubes and exit openings are arranged in a single row.

8. A gas turbine combustion chamber in accordance with claim 4, wherein the at least one of the feed tubes and the exit openings are arranged in multiple rows.

9. A gas turbine combustion chamber in accordance with claim 4, wherein the at least one of the feed tubes and the exit openings are provided with different outlet diameters.

10. A gas turbine combustion chamber in accordance with claim 4, wherein the at least one of the feed tubes and the exit openings are provided in different arrangements.

11. A gas turbine combustion chamber in accordance with claim 4, wherein the at least one of the feed tubes and the exit openings comprise a device for active cooling.

12. A gas turbine combustion chamber in accordance with claim 4, wherein the at least one of the feed tubes and the exit openings comprise an air flashing device for the purging of fuel.

13. A gas turbine combustion chamber in accordance with claim 4, wherein the feed tubes are arranged radially starting out from a central fuel line.

14. A gas turbine combustion chamber in accordance with claim 4, wherein the feed tubes have at least one of an aerodynamic and profiled design.

15. A gas turbine combustion chamber in accordance with claim 4, wherein the feed tubes extend at least one of radially and axially to a nozzle axis.

16. A gas turbine combustion chamber in accordance with claim 4, wherein the exit openings are combined with a central fuel injection.

17. A gas turbine combustion chamber in accordance with claim 1, wherein fuel is injected into a primary air passage carrying a major amount of the airflow.

18. A gas turbine combustion chamber in accordance with claim 1, and comprising a pilot swirler and a pilot nozzle arranged centrally for central fuel injection.

19. A method for introducing fuel into a gas turbine combustion chamber comprising a burner, and means for the supply of fuel, the burner comprising an atomizer and a primary airflow through the atomizer, the primary airflow having at least one of: a varying velocity distribution through the atomizer with a maximum airflow velocity and a minimum airflow velocity, and a varying air mass flow distribution through the atomizer with a maximum local air mass flow and a minimum local air mass flow, the method comprising: injecting fuel from the means for the supply of fuel into areas of the primary air flow having at least one of: the maximum airflow velocity and the maximum local air mass flow.

* * * * *